US006552881B1

(12) United States Patent
Pinarbasi

(10) Patent No.: US 6,552,881 B1
(45) Date of Patent: Apr. 22, 2003

(54) SPIN VALVE SENSOR WITH MAGNETIC AND NONMAGNETIC LAYERS FOR IMPROVING ASYMMETRY AND SOFTNESS OF A FREE LAYER STRUCTURE

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,685

(22) Filed: May 17, 2000

(51) Int. Cl.[7] .............................................. G11B 5/127
(52) U.S. Cl. ................................................... 360/324.1
(58) Field of Search ........................ 360/324.1, 324.11, 360/324.12, 314, 317

(56) References Cited

U.S. PATENT DOCUMENTS 6,178,072 B1    1/2001   Gill ........................ 360/324.11
6,181,534 B1    1/2001   Gill ........................ 360/324.11
6,262,869 B1    7/2001   Lin et al. ................ 360/324.11

OTHER PUBLICATIONS

U.S. patent application Ser. No. 09/547,440, Pinarbasi, filed Apr. 12, 2000.

*Primary Examiner*—George Letscher
(74) *Attorney, Agent, or Firm*—Ervin F. Johnston

(57) ABSTRACT

A nonmagnetic conductive layer is provided on top of a free layer structure for at least counterbalancing sense current fields from conductive layers below the free layer structure so as to improve readback asymmetry of the spin valve sensor. Further, a magnetic conductive layer is provided on top of the nonmagnetic conductive layer for at least partially counterbalancing a demagnetizing field emanating from a pinned layer structure below the free layer structure. The nonmagnetic conductive layer, which is preferably copper (Cu), isolates the magnetization of the magnetic conductive layer from the free layer structure and also improves the soft magnetic properties of the free layer structure.

50 Claims, 9 Drawing Sheets

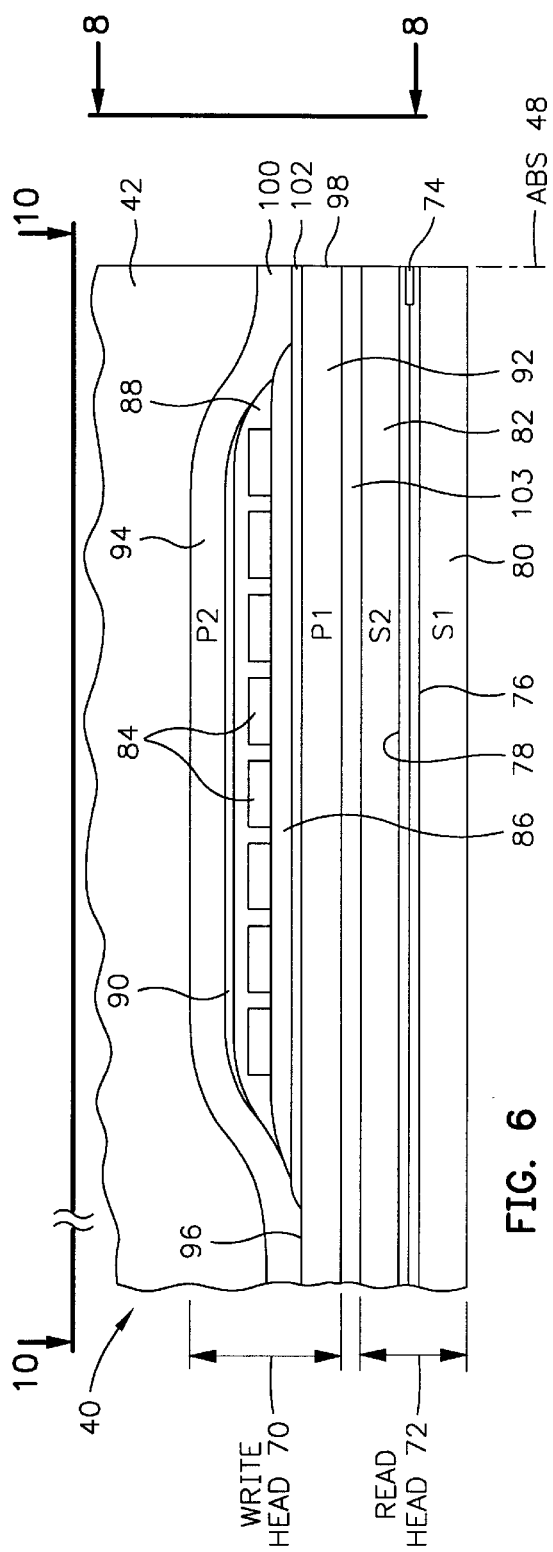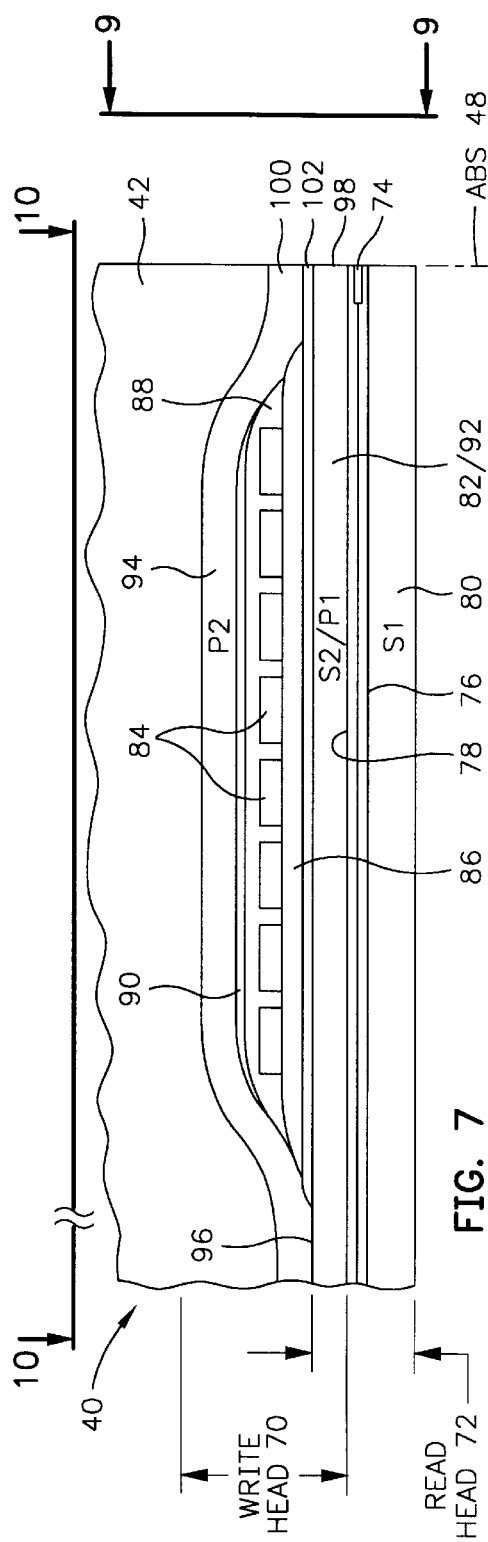

(ABS)

US 6,552,881 B1

SPIN VALVE SENSOR WITH MAGNETIC AND NONMAGNETIC LAYERS FOR IMPROVING ASYMMETRY AND SOFTNESS OF A FREE LAYER STRUCTURE

BACKGROUND OF THE INVENTION

1. Field of the Invention

The present invention relates to a spin valve sensor with magnetic and nonmagnetic layers for improving asymmetry and softness of a free layer structure and, more particularly, to a magnetic keeper layer for providing flux closure for a pinned layer structure and a nonmagnetic layer for counterbalancing sense current fields and improving the softness of the free layer structure.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos\theta$, where $\theta$ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. In order to improve the sensitivity of the spin valve sensor a soft magnetic material, such as nickel iron (NiFe), is employed as the free layer. It has been found, however, that when a free layer structure employs a cobalt based layer in addition to the nickel iron (NiFe) free layer that the magnetoresistive coefficient dr/R increases when the cobalt based layer is located between and interfaces the nickel iron (NiFe) free layer and a copper (Cu) spacer layer. Because of the high magnetoresistance of a spin valve sensor it is sometimes referred to as a giant magnetoresistive (GMR) sensor.

The transfer curve for a spin valve sensor is defined by the aforementioned $\cos\theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max(V_1 \text{ or } V_2)}.$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will, of course, reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry.

There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. Magnetic instability of the free layer is greater when the readback asymmetry is positive. Accordingly, the magnetic instability of the free layer is greater when the readback asymmetry is positive than when the readback asymmetry is negative. A positive readback asymmetry can be improved by changing thickness of the magnetic layers and/or changing the sense current, however, a change of one of these parameters can change other parameters making it a trial and error process to reduce the asymmetry. More importantly, however, is that the channel electronics of the disk drive as well as specific thicknesses of the magnetic layers are designed to satisfy other magnetic considerations. Since these values are set it is manifest that there is a need to deal with the many magnetic influences on the free layer of the AP pinned spin valve so that the net value of these influences on the free layer can be reduced to virtually zero thereby reducing the asymmetry to virtually zero.

The location of the transfer curve relative to the bias point is influenced by four major forces on the free layer of a spin valve sensor, namely a ferromagnetic coupling field $H_{FC}$ between the pinned layer and the free layer, a net demag field $H_D$ from the pinned layer, a sense current field $H_I$ from all conductive layers of the spin valve except the free layer, a net image current field $H_{IM}$ from the first and second shield layers. The strongest magnetic force on the free layer structure is the sense current field $H_I$. In an exemplary bottom spin valve sensor where the free layer is closer to the second gap layer than it is to the first gap layer the majority of the conductive layers are below the free layer structure between the free layer structure and the first gap layer. The amount of conductive material in this region is further increased if the pinning layer is metal instead of an oxide, such as nickel oxide (NiO). Accordingly, when the sense current is conducted through the sensor the conductive layers below the free layer structure causes a sense current field on the free layer structure which is minimally counterbalanced by a typical cap layer made of tantalum (Ta) on top of the free layer structure. Accordingly, there is a strong-felt need to counterbalance the strong sense current field exerted by the conductive layers of the spin valve sensor below the free layer structure in a bottom spin valve sensor. Further, the pinned layer structure below the free layer structure in a bottom spin valve sensor exerts a demagnetizing field on the free layer structure which needs to be counterbalanced to improve asymmetry of the spin valve sensor. There is a strong-felt need to counterbalance the sense current and demagnetizing fields and optimize the sense current, the pinning layer structure and the type of material of the pinning layer while still obtaining the desired readback symmetry of the spin valve sensor.

SUMMARY OF THE INVENTION

The present invention provides a nonmagnetic conductive layer that interfaces the top of the free layer structure in a bottom spin valve sensor for the purpose of producing a sense current field which counterbalances, to the extent desirable, a sense current field from conductive layers below the free layer structure. In the preferred embodiment the nonmagnetic conductive layer is copper which also improves the softness of the free layer structure so that the magnetic moment of the free layer structure is more responsive in its rotation to magnetic field signals from the rotating magnetic disk. The invention further includes a magnetic keeper layer with the nonmagnetic conductive layer located between the keeper layer and the free layer structure so that the magnetic moment of the keeper layer is isolated from the free layer structure. The keeper layer provides flux closure, to the extent desired, for the demagnetizing field from the pinned layer structure below the free layer structure in the bottom spin valve sensor. In a preferred embodiment the keeper layer is nickel iron (NiFe). In a still further embodiment a second nonmagnetic conductive layer is provided with the keeper layer located between the first and second nonmagnetic conductive layers. The second nonmagnetic conductive layer isolates the keeper layer from a tantalum (Ta) cap layer so as to improve the softness of the keeper layer and provides an additional sense current field for counterbalancing the sense current fields exerted by the conductive layers below the free layer structure.

An object of the present invention is to provide a pair of layers between a free layer structure and a cap layer of a spin valve sensor for improving playback asymmetry as well as improving soft magnetic properties of the free layer structure.

Another object is to provide a copper layer on top of a free layer structure in a spin valve sensor for at least partially counterbalancing sense current fields from conductive layers below the free layer structure and for improving soft magnetic properties of the free layer structure in combination with a magnetic keeper layer on top of the copper layer for providing at least partial flux closure for a pinned layer structure below the free layer structure.

Still another object is to provide a second copper layer on top of the keeper layer in the preceding object for the purpose of improving soft magnetic properties of the keeper layer and providing an additional sense current field for at least partially counterbalancing sense current fields from conductive layers below the free layer structure.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
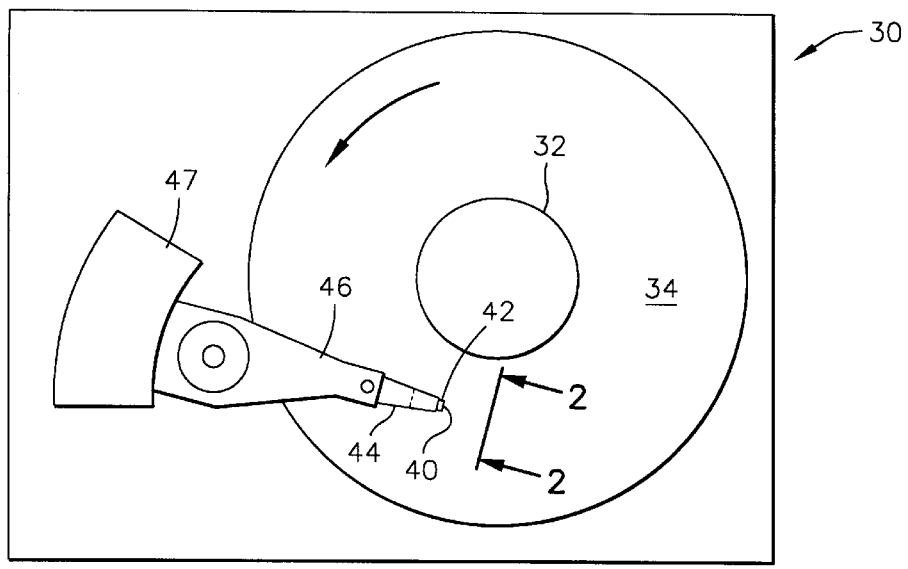
FIG. 1 is a plan view of an exemplary magnetic disk drive.
Figure 2:
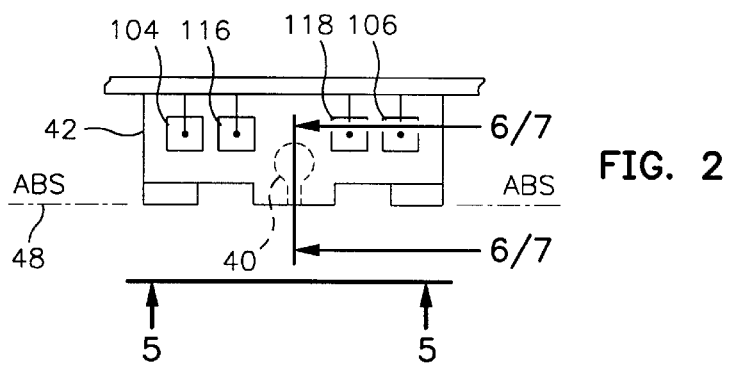
FIG. 2 is an end view of a slider with a magnetic head of the disk drive as seen in plane 2—2 of FIG. 1.
Figure 3:
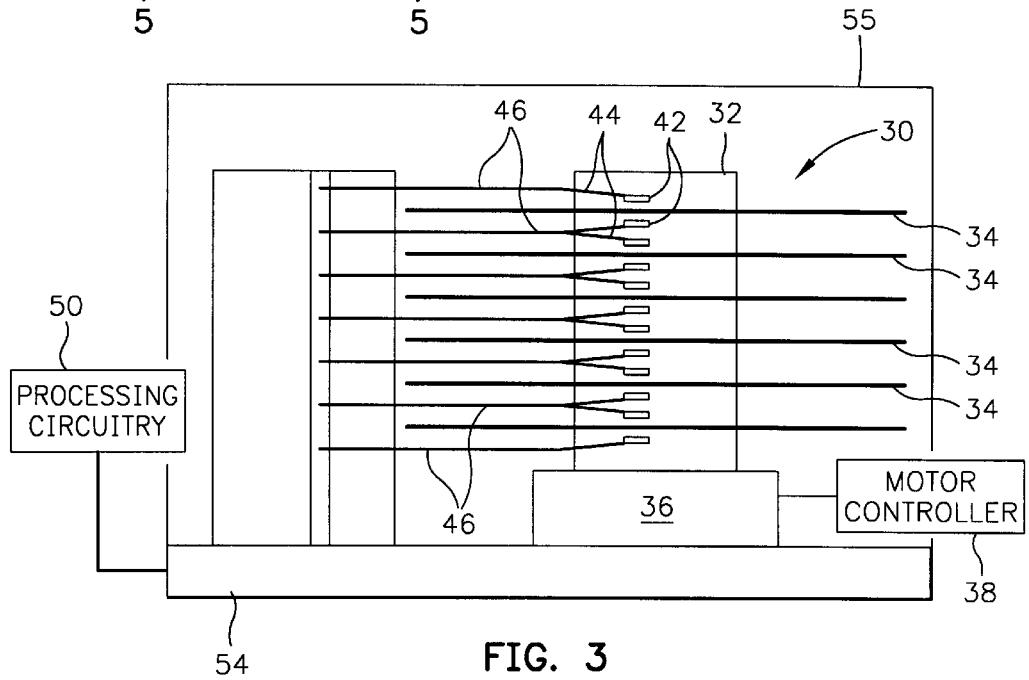
FIG. 3 is an elevation view of the magnetic disk drive wherein multiple disks and magnetic heads are employed.
Figure 4:
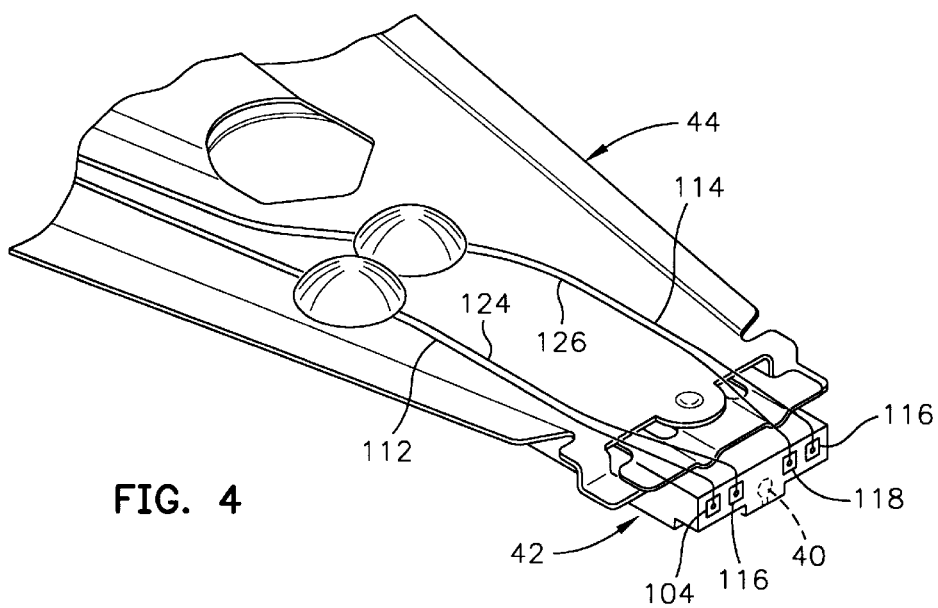
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
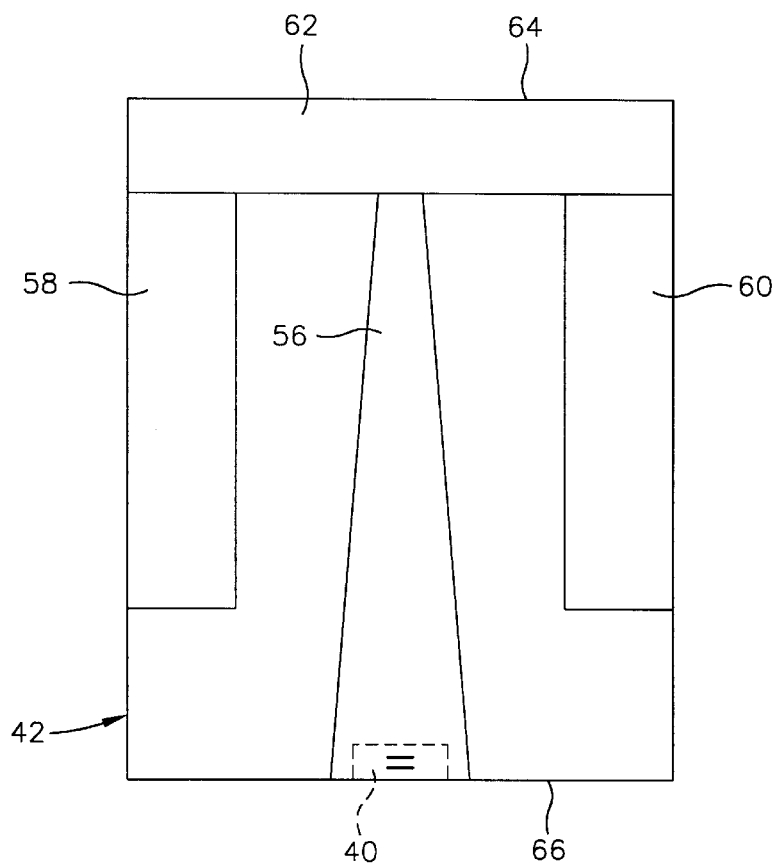
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
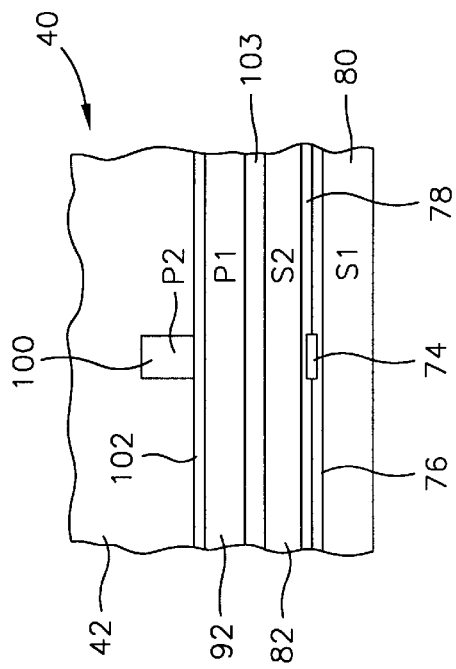
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
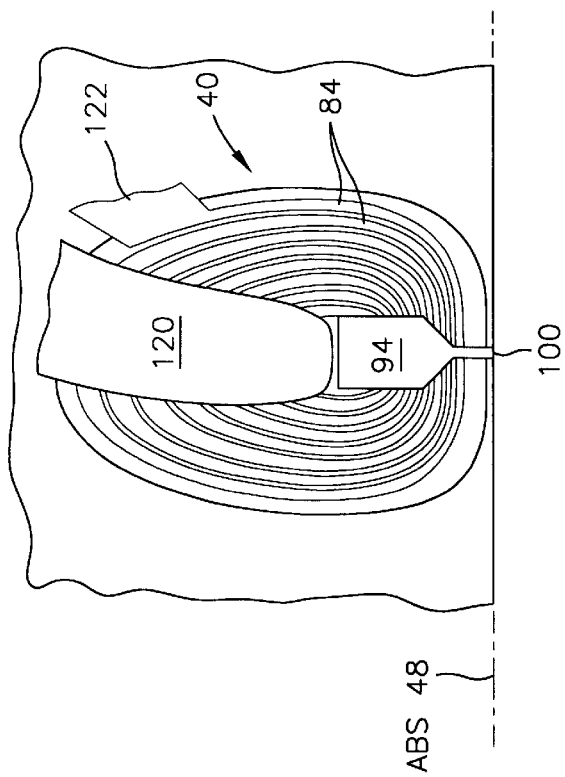
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
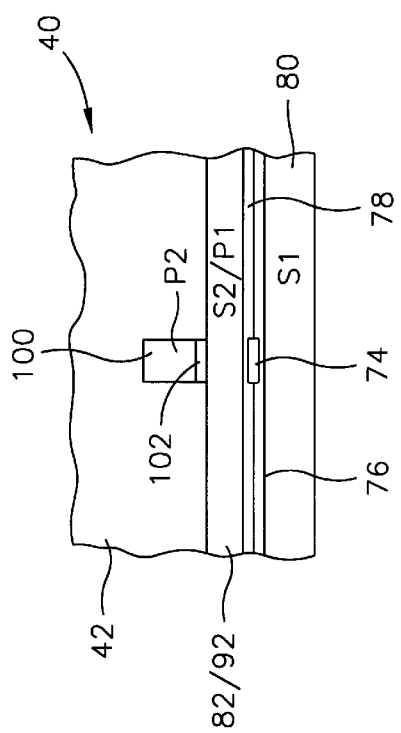
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
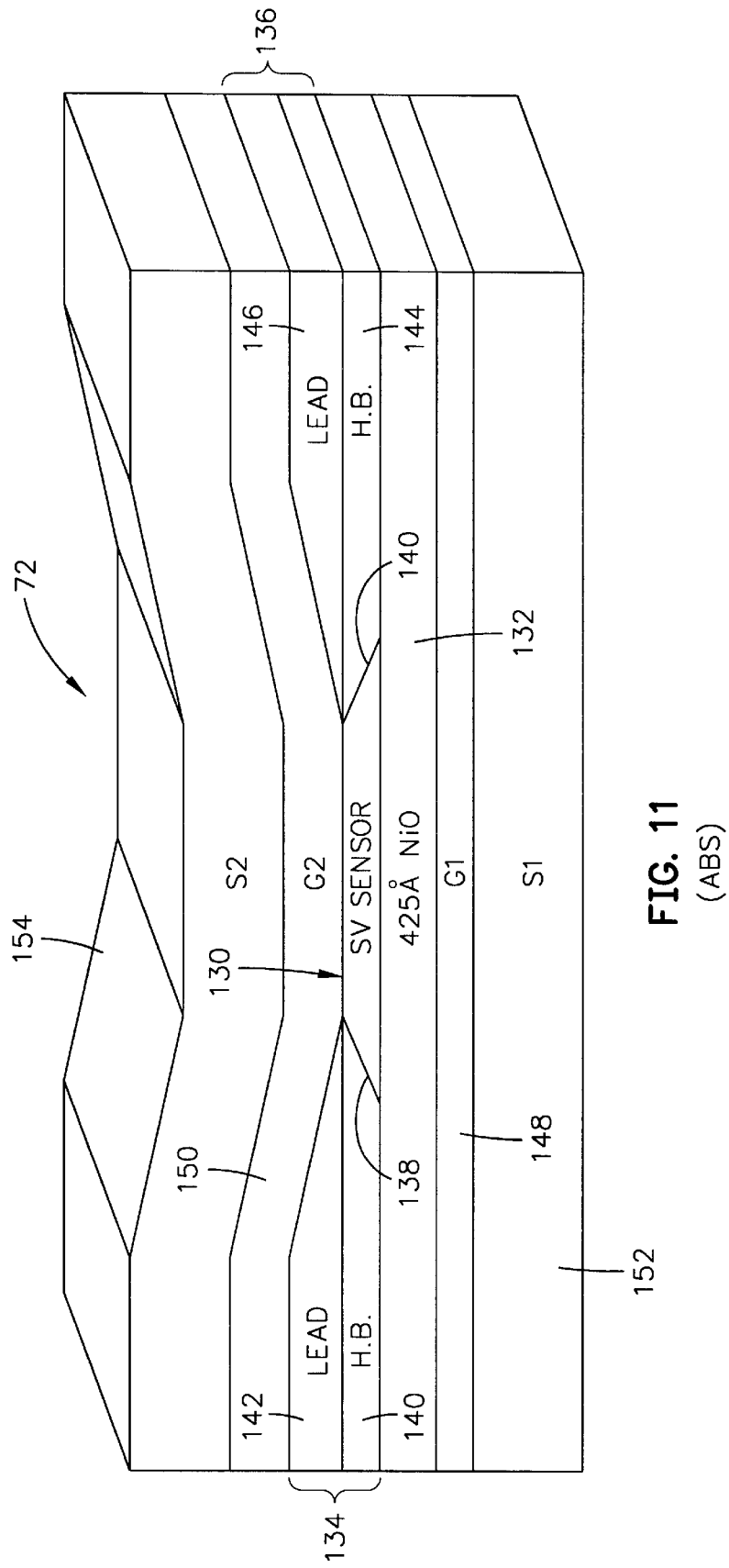
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

THE INVENTION

EXAMPLE 1

First Embodiment of the Present Invention

Figure 12:
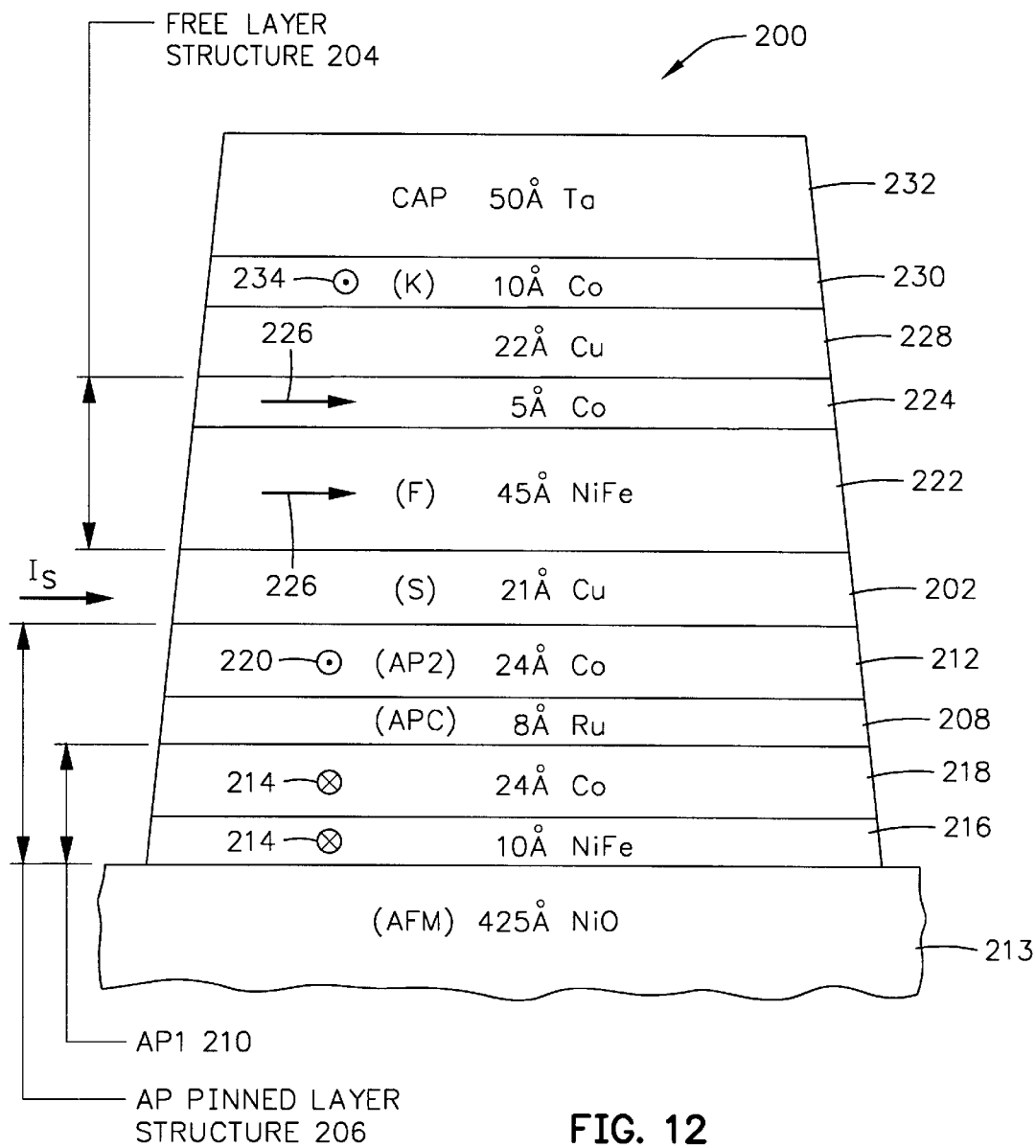
FIG. 12 is an ABS illustration of a first embodiment of the present invention.

FIG. 12 shows an ABS view of a first example of the present spin valve sensor 200 which includes a nonmagnetic conductive spacer layer (S) 202 which is located between a ferromagnetic free layer structure 204 and a ferromagnetic antiparallel (AP) pinned layer structure 206. The AP pinned layer structure 206 includes an antiparallel coupling layer (APC) 208 which is located between first and second AP pinned layers (AP1) and (AP2) 210 and 212. The first AP pinned layer 210 is exchange coupled to an antiferromagnetic (AFM) pinning layer 213 so that a magnetic moment 214 of the first AP pinned layer is pinned perpendicular to the ABS in an exemplary direction into the sensor as shown in FIG. 12. The first AP pinned layer includes first and second layers 216 and 218 wherein the first layer is nickel iron ($Ni_{82}Fe_{18}$) and interfaces the pinning layer 213 and the second layer is cobalt (Co) and is located on top of the first layer 216. The nickel iron ($Ni_{82}Fe_{18}$) first layer 216 improves the pinning performance of the AP pinned layer structure 206. By strong antiparallel coupling between the first and second AP pinned layers 210 and 212 the second AP pinned layer has a magnetic moment 220 which is antiparallel to the magnetic moment 214.

The free layer structure 204 includes a free layer (F) 222. The present invention provides the free layer structure 204 with a second layer 224 which is cobalt and is located on top of the free layer 222. The free layer structure 204 has a magnetic moment 226 which is parallel to the ABS and may be directed from right to left or left to right as shown in FIG. 12. When a field signal from the rotating magnetic disk rotates the magnetic moment 226 into the head the magnetic moments 226 and 220 become more antiparallel which increases the resistance of the spin valve sensor to the sense current $I_S$ and when the signal field rotates the magnetic moment 226 out of the head the magnetic moments 226 and 220 become more parallel which decreases the resistance of the spin valve sensor to the sense current. When the magnetic moment 226 of the free layer structure is positioned parallel to the ABS with the sense current $I_S$ conducted through the sensor, but without any signal fields, the spin valve sensor will have read signal symmetry. This is called the quiescent condition of the read head. However, if the magnetic moment 226 is positioned at an angle to the parallel location during this quiescent condition then the spin valve sensor has readback asymmetry.

The present invention further provides a copper (Cu) layer 228 which interfaces the free layer structure 204 and is located on top thereof and a magnetic conductive layer 230, which is referred to hereinafter as a keeper layer (K), which is located between the nonmagnetic conductive layer 228 and a cap layer 232.

The thicknesses and materials of the various layers of the first example 200 are 425 Å of nickel oxide (NiO) for the pinning layer 212, 10 Å of nickel iron ($Ni_{82}Fe_{18}$) for the first layer 216, 24 Å of cobalt (Co) for the second layer 218, 8 Å of ruthenium (Ru) for the antiparallel coupling layer 208, 24 Å of cobalt (Co) for the second AP pinned layer 212, 21 Å of copper (Cu) for the spacer layer 202, 45 Å of nickel iron ($Ni_{82}Fe_{18}$) for the free layer 222, 5 Å of cobalt (Co) for the layer 224, 22 Å of copper (Cu) for the nonmagnetic conductive layer 228, 10 Å of cobalt (Co) for the keeper layer 230 and 50 Å of tantalum (Ta) for the cap layer 232.

Since the magnetic moment 214 of the first AP pinned layer is greater than the magnetic moment 220 of the second AP pinned layer 212 the keeper layer 230 has a magnetic moment 234 which is perpendicular to the ABS and is directed antiparallel to the magnetic moment 214 so as to provide flux closure therefor. If the magnetic moment 220 of the second AP pinned layer had been greater than the magnetic moment 214, then the magnetic moment 234 would be directed into the sensor instead of out of the sensor in order to provide flux closure. The copper (Cu) layer 228 separates the keeper layer 230 from the free layer structure 204 so that the magnetic moment 234 of the keeper layer has no influence on the magnetic moment 226 of the free layer structure. It can be seen from FIG. 12 that the conductive layers 216, 218, 208, 212 and 202 below the free layer structure 204 will exert a sense current field on the free layer structure upon the conduction of the sense current $I_S$ through the sensor. This sense current field will be directed out of the free layer structure and can be at least partially counterbalanced by the copper (Cu) layer 228 when the sense current $I_S$ is conducted therethrough. The copper (Cu) of the layer 228 improves the permeability of the free layer structure 204 by its interface with the cobalt (Co) layer 224 of the free layer structure. Since the cobalt (Co) keeper layer 230 is also conductive it will contribute to at least partially counterbalancing the sense current fields from the conductive layers below the free layer structure 204. Since tantalum (Ta) is not a very good conductor the cap layer 232 contributes little to counterbalancing the sense current fields from the conductive layers below the free layer structure.

Upon testing the spin valve sensor 200 shown in FIG. 12 the magnetoresistive coefficient dr/R was 3.5% and the ferromagnetic coupling field $H_{FC}$ was 0.42 Oe. The ferromagnetic coupling field exerted on the free layer structure 204 is due to the magnetic moment 220 of the second AP pinned layer and is parallel to the magnetic moment 220.

EXAMPLE 2

Second Embodiment of the Invention

Figure 13:
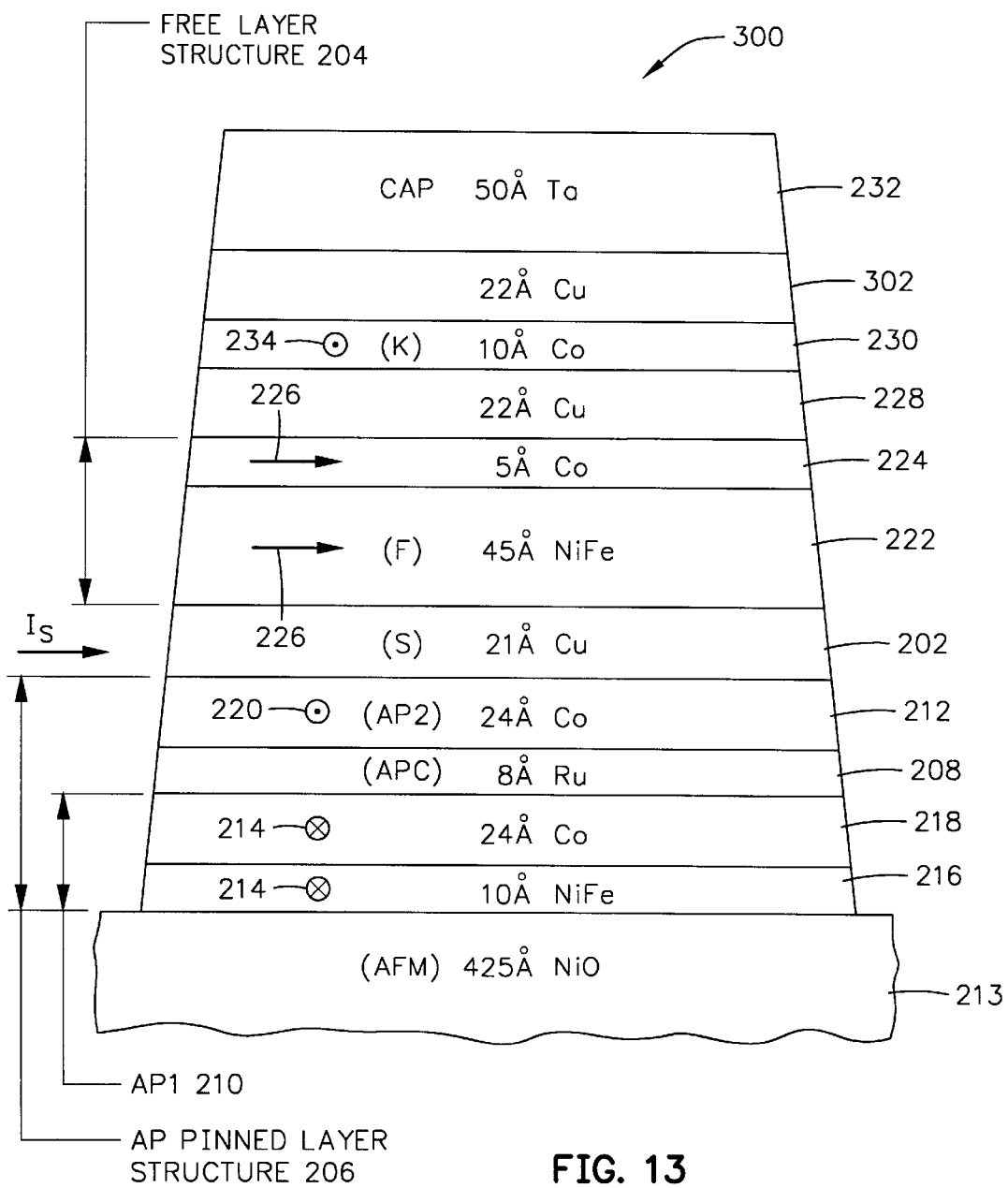
FIG. 13 is an ABS illustration of a second embodiment of the present invention.

FIG. 13 shows an ABS illustration of a second example 300 of the present spin valve sensor which is the same as the spin valve sensor 200 shown in FIG. 12 with the exception of a second copper (Cu) layer 302 which is located between the keeper layer 230 and the cap layer 232. The second copper (Cu) layer 302 is 22 Å of copper (Cu) and performs two significant functions. First, the copper of the layer 302 increases the permeability of the keeper layer 230 so that its function as a keeper layer is improved. Secondly, the layer 302 provides additional sense current field which may be employed for at least partially counterbalancing the sense current fields from the conductive layers below the free layer structure 204.

Upon testing the spin valve sensor 300 shown in FIG. 13 the magnetoresistive coefficient dr/R was 3.51 and the ferromagnetic coupling field $H_{FC}$ was −0.71. The minus indicates that the ferromagnetic coupling field exerted on the free layer structure 204 was in a direction antiparallel to the magnetic moment 220 of the second AP pinned layer.

EXAMPLE 3

Third Embodiment of the Present Invention

Figure 14:
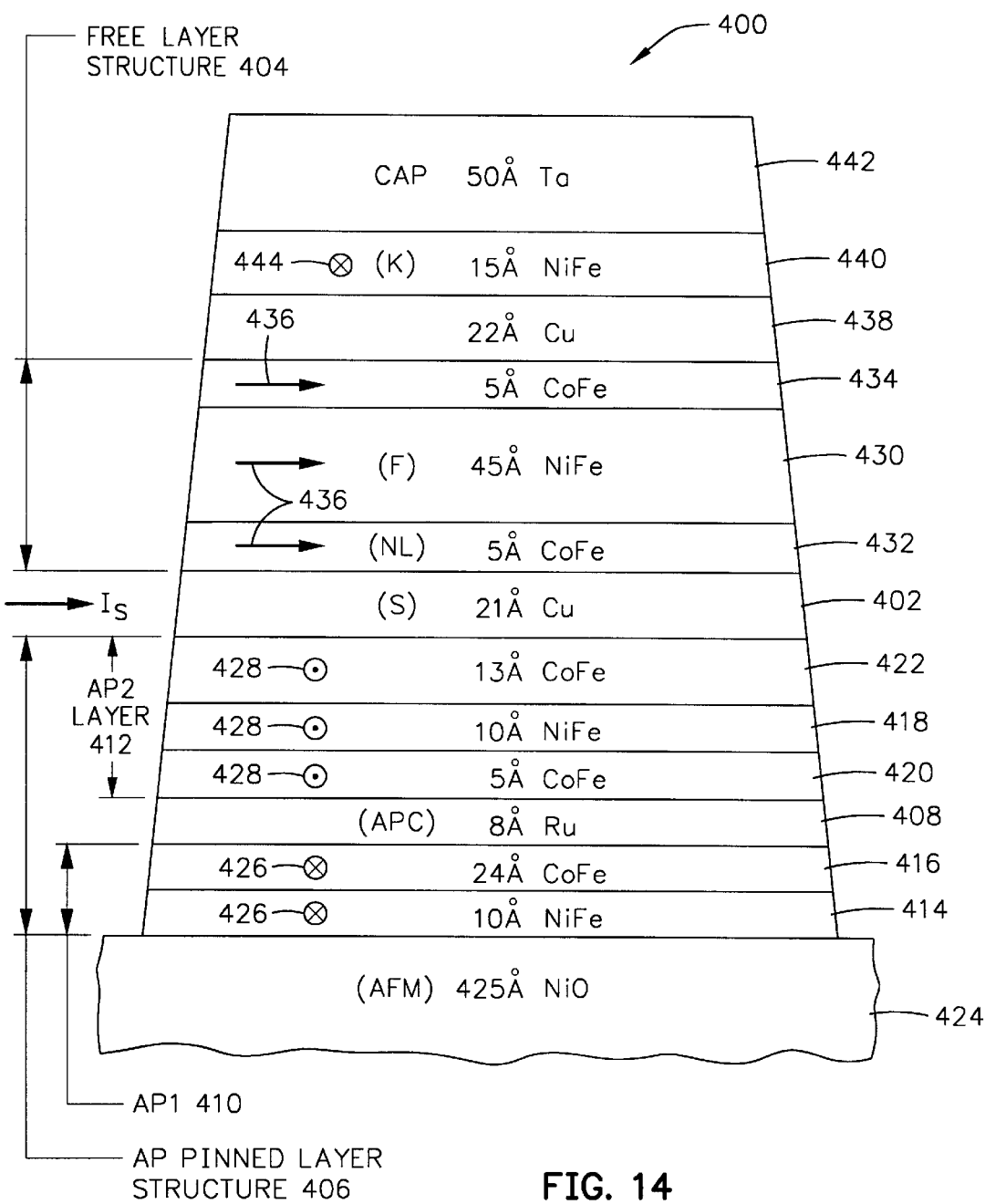
FIG. 14 is an ABS illustration of a third embodiment of the present invention.

FIG. 14 is an ABS illustration of a third embodiment 400 of the present spin valve sensor which includes a spacer layer (S) 402 which is located between a free layer structure 404 and an antiparallel (AP) pinned layer structure 406. The AP pinned layer structure 406 includes an antiparallel coupling layer (APC) 408 which is located between first and second AP pinned layers (AP1) and (AP2) 410 and 412. The first AP pinned layer 410 includes first and second layers 414 and 416 and the second AP pinned layer 412 includes a first layer 418 which is located between second and third layers 420 and 422. The thicknesses and materials for the AP pinned layer structure 406 are 10 Å of nickel iron ($Ni_{82}Fe_{18}$) for the layer 414, 24 Å of cobalt iron ($Co_{90}Fe_{10}$) for the layer 416, 8 Å of ruthenium (Ru) for the layer 408, 5 Å of cobalt iron ($Co_{90}Fe_{10}$) for the layer 420, 10 Å of nickel iron ($Ni_{82}Fe_{18}$) for the layer 418 and 13 Å of cobalt iron ($Co_{90}Fe_{10}$) for the layer 422. The layer 414 is exchange coupled to an antiferromagnetic (AFM) pinning layer 424 which pins a magnetic moment 426 of the first AP pinned layer perpendicular to the ABS in an exemplary direction into the sensor as shown in FIG. 14. By strong antiparallel coupling between the first and second AP pinned layers 410 and 412 a magnetic moment 428 of the second AP pinned layer is antiparallel to the magnetic moment 426.

The free layer structure 404 includes a free layer (F) 430 which is located between a nanolayer (NL) 432 and a cobalt iron ($Co_{90}Fe_{10}$) layer 434 which functions similarly to the layer 224 in FIG. 12. The nanolayer 432 interfaces the spacer layer 402 and significantly increases the magnetoresistive coefficient dr/R of the spin valve sensor. The free layer structure 404 has a magnetic moment 436 which is parallel to the ABS when the spin valve sensor has readback symmetry and is directed either from right to left or left to right as shown FIG. 14. When a signal field rotates the magnetic moment 436 into the head the magnetic moment 436 becomes more antiparallel to the magnetic moment 428 causing an increase in resistance of the spin valve sensor to the sense current $I_S$ and when the signal field rotates the magnetic moment 436 out of the head the magnetic moments 436 and 428 become more parallel which decreases the resistance of the spin valve sensor to the sense current $I_s$. The increases and decreases in resistance of the spin valve sensor changes the potentials in the sense current circuit which are processed as playback signals by the processing circuitry 50 shown in FIG. 3.

The invention further provides a copper (Cu) layer 438 and a nickel iron ($Ni_{82}Fe_{18}$) keeper layer (K) 440 with the keeper layer 440 located between the copper (Cu) layer 438 and a cap layer 442.

The thicknesses and materials of the other layers of the spin valve sensor are 5 Å of cobalt iron ($Co_{90}Fe_{10}$) for the nanolayer 432, 45 Å of nickel iron ($Ni_{82}Fe_{18}$) for the free layer 430, 5 Å of cobalt iron ($Co_{90}Fe_{10}$) for the layer 434, 22 Å of copper (Cu) for the layer 438, 15 Å of nickel iron ($Ni_{82}Fe_{18}$) for the keeper layer 440 and 50 Å of tantalum (Ta) for the cap layer 442.

Since the second AP pinned layer 412 has the greater magnetic moment the keeper layer 440 has a magnetic moment 444 which is antiparallel to the magnetic moment 428 so as to provide at least partial flux closure. Since the keeper layer 440 is conductive it will also provide a sense current field which at least partially counterbalances sense current fields coming from the conductive layers below the free layer structure 404. The main source for counterbalancing the sense current fields from the conductive layers below the free layer structure, however, is the copper (Cu) layer 438 which also improves the softness of the free layer structure 404. Nickel iron ($Ni_{82}Fe_{18}$) is the preferred material for the keeper layer 440.

Upon testing the spin valve sensor 400 in FIG. 14 the magnetoresistive coefficient dr/R was 6.63% and the ferromagnetic coupling field $H_{FC}$ was 5.0 Oe.

EXAMPLE 4

Fourth Embodiment of the Invention

Figure 15:
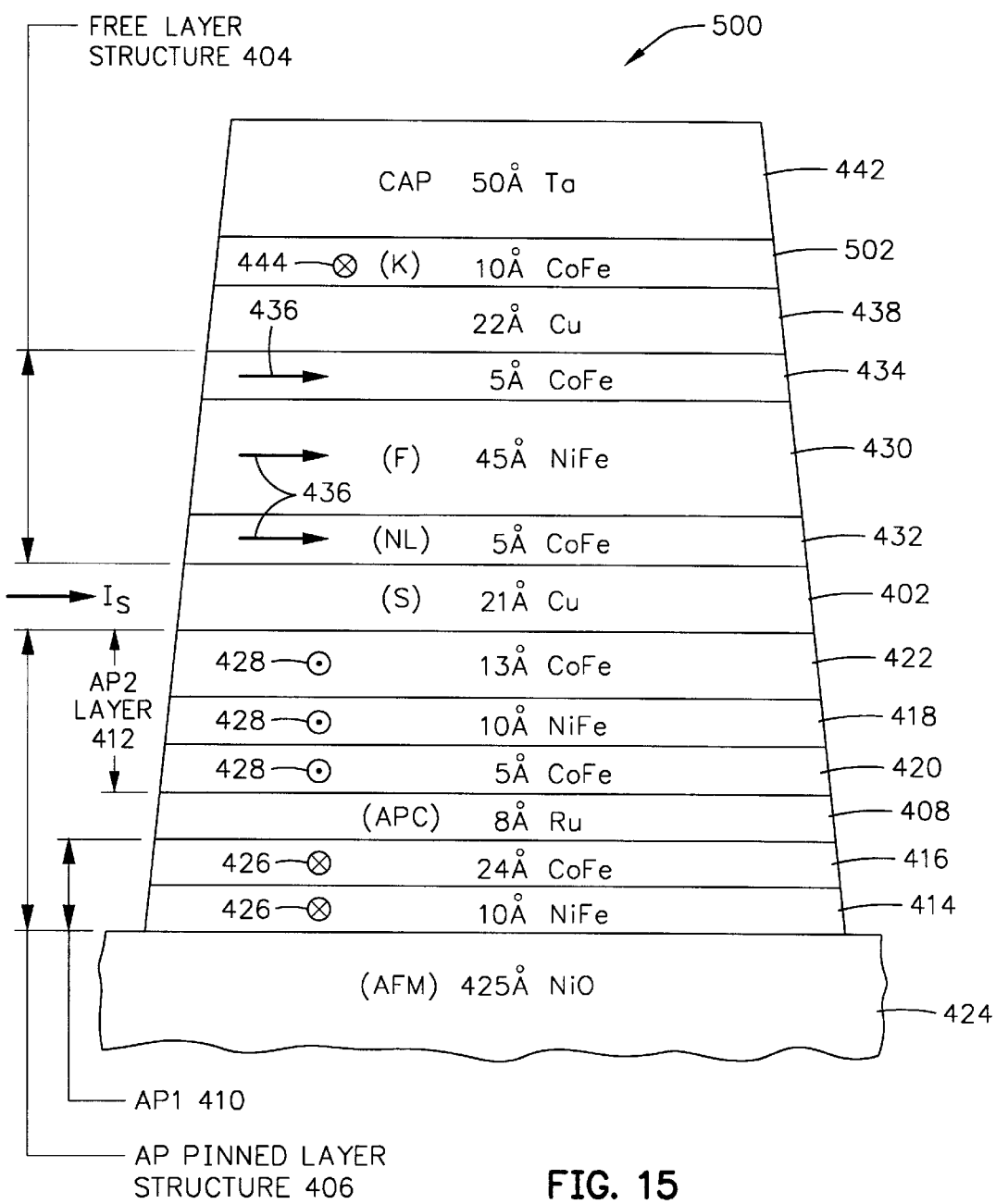
FIG. 15 is an ABS illustration of a fourth embodiment of the present invention.

FIG. 15 shows an ABS illustration of a fourth embodiment 500 of the present spin valve sensor which is the same as the spin valve sensor 400 shown in FIG. 14 except the keeper layer 502 is 10 Å of cobalt iron ($Co_{90}Fe_{10}$) instead of 15 Å of nickel iron ($Ni_{82}Fe_{18}$). Upon testing the spin valve sensor 500 in FIG. 15 the magnetoresistive coefficient dr/R was 5.57% and the ferromagnetic coupling field $H_{FC}$ was 1.74 Oe.

DISCUSSION

In all embodiments the pinning layers 213 in FIGS. 12 and 13 and the pinning layer 424 in FIGS. 14 and 15 may be located directly upon the first read gap layer 148 shown in FIG. 1. If the pinning layer is nickel oxide (NiO), as shown, the pinning layer also provides additional thickness to the read gap. However, it should be understood that the pinning layer may be other materials such as platinum manganese (PtMn), nickel manganese (NiMn), or iridium manganese (IrMn). It should be understood that the percentage of each element in each of the alloys nickel iron (NiFe) and cobalt iron (CoFe) layers in each of the embodiments in FIGS. 12–15 may be any value provided the total percentage for each alloy equals 100%. It should be understood that the cobalt iron (CoFe) layers in the embodiments may be cobalt (Co) or the cobalt (Co) layers may be cobalt iron (CoFe). While copper (Cu) is preferred for each of the layers 228 in FIGS. 12 and 13 and 438 in FIGS. 14 and 15, it should be understood that another nonmagnetic conductive layer may be substituted therefor.

It can be seen that the nonmagnetic conductive layer 228 or 438 and the magnetic conductive keeper layer 230 or 440 of the present invention provide flexibility for counterbalancing sense current and demagnetizing fields so that the sense current $I_S$ and the thicknesses of the layers below the free layer structure can be optimized for improving performance of the spin valve sensor. While an AP pinned layer structure has been shown for each of the embodiments in FIGS. 12–15 it should be understood that the pinned layer structure may be a single pinned layer structure which may be a single ferromagnetic layer or multi-ferromagnetic layers without an antiparallel coupling layer. When the pinned layer structure is a single ferromagnetic layer it should be understood that the demagnetizing field will be greater than the net demagnetizing field from an AP pinned layer structure. Accordingly, for single pinned layer structures the employment of the layers provided by the present invention may be even more important for counterbalancing the demagnetizing field than simply counterbalancing the smaller net demagnetizing field of the AP pinned layer structure.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor including:
      a ferromagnetic free layer structure that has a magnetic moment;
      a ferromagnetic pinned layer structure that has a magnetic moment;
      a nonmagnetic conductive spacer layer located between the free layer structure and the pinned layer structure;
      an antiferromagnetic metallic pinning layer exchange coupled to the pinned layer structure for pinning the magnetic moment of the pinned layer structure;

a conductive magnetic keeper layer for providing at least a partial magnetic flux closure for said pinned layer structure; and a nonmagnetic conductive first sense current field producing layer located between the keeper layer and the free layer structure for at least partially counterbalancing sense current fields from layers on an opposite side of the free layer structure.

2. A magnetic read head as claimed in claim 1 including:

first and second hard bias and lead layers connected to the spin valve sensor;

nonmagnetic nonconductive first and second read gap layers;

the spin valve sensor and the first and second hard bias and lead layers being located between the first and second read gap layers;

ferromagnetic first and second shield layers; and the first and second read gap layers being located between the first and second shield layers.

3. A magnetic read head as claimed in claim 2 wherein the keeper layer is nickel iron (NiFe).

4. A magnetic read head as claimed in claim 2 wherein the keeper layer is cobalt based and the first sense current field producing layer is copper.

5. A magnetic read head as claimed in claim 4 wherein the free layer structure includes a nickel iron (NiFe) free layer and a cobalt based layer with the cobalt based layer being located between the free layer and the first sense current field producing layer.

6. A magnetic read head as claimed in claim 5 wherein the free layer structure further includes a cobalt based nanolayer which is located between the free layer and the spacer layer.

7. A magnetic read head as claimed in claim 6 wherein the pinned layer structure is an antiparallel (AP) pinned layer structure that includes:

first and second ferromagnetic AP pinned layers; and an antiparallel coupling layer located between the first and second AP pinned layers.

8. A magnetic read head as claimed in claim 4 including:

a nonmagnetic conductive second sense current field producing layer;

the keeper layer being located between the first and second sense current field producing layers; and the second sense current field producing layer being copper.

9. A magnetic read head as claimed in claim 8 wherein the free layer structure includes a nickel iron (NiFe) free layer and a cobalt based layer with the cobalt based layer being located between the free layer and the first sense current field producing layer.

10. A magnetic read head as claimed in claim 9 wherein the pinned layer structure is an antiparallel (AP) pinned layer structure that includes:

first and second ferromagnetic AP pinned layers; and an antiparallel coupling layer located between the first and second AP pinned layers.

11. A magnetic head assembly comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

the read head including:

a spin valve sensor;

first and second hard bias and lead layers connected to the valve sensor;

nonmagnetic nonconductive first and second read gap layers;

the spin valve sensor and the first and second hard bias and lead layers being located between the first and second read gap layers;

a ferromagnetic first shield layer; and the first and second gap layers being located between the first shield layer and the first pole piece layer;

the spin valve sensor including:

a ferromagnetic free layer structure that has a magnetic moment;

a ferromagnetic pinned layer structure that has a magnetic moment;

a nonmagnetic conductive spacer layer located between the free layer structure and the pinned layer structure;

an antiferromagnetic metallic pinning layer exchange coupled to the pinned layer structure for pinning the magnetic moment of the pinned layer structure;

a conductive magnetic keeper layer for providing at least a partial magnetic flux closure for said pinned layer structure; and a nonmagnetic conductive first sense current field producing layer located between the keeper layer and the free layer structure for at least partially counterbalancing sense current fields from layers on an opposite side of the free layer structure.

12. A magnetic head assembly as claimed in claim 11 including:

a ferromagnetic second shield layer;

a nonmagnetic isolation layer; and the second shield layer being located between the second gap layer and the isolation layer and the nonmagnetic isolation layer being located between the second shield layer and the first pole piece layer.

13. A magnetic head assembly as claimed in claim 11 wherein the keeper layer is nickel iron (NiFe).

14. A magnetic head assembly as claimed in claim 11 wherein the keeper layer is cobalt based and the first sense current field producing layer is copper.

15. A magnetic head assembly as claimed in claim 14 wherein the free layer structure includes a nickel iron (NiFe) free layer and a cobalt based layer with the cobalt based layer being located between the free layer and the first sense current field producing layer.

16. A magnetic head assembly as claimed in claim 15 wherein the free layer structure further includes a cobalt based nanolayer which is located between the free layer and the spacer layer.

17. A magnetic head assembly as claimed in claim 16 wherein the pinned layer structure is an antiparallel (AP) pinned layer structure that includes:

first and second ferromagnetic AP pinned layers; and an antiparallel coupling layer located between the first and second AP pinned layers.

18. A magnetic head assembly as claimed in claim 14 including:

a nonmagnetic conductive second sense current field producing layer;

the keeper layer being located between the first and second sense current field producing layers; and the second sense current field producing layer being copper.

19. A magnetic head assembly as claimed in claim 18 wherein the free layer structure includes a nickel iron (NiFe) free layer and a cobalt based layer with the cobalt based layer being located between the free layer and the first sense current field producing layer.

20. A magnetic head assembly as claimed in claim 19 wherein the pinned layer structure is an antiparallel (AP) pinned layer structure that includes:
   first and second ferromagnetic AP pinned layers; and
   an antiparallel coupling layer located between the first and second AP pinned layers.

21. A magnetic disk drive comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   a read head including:
      a spin valve sensor;
      first and second hard bias and lead layers connected the spin valve sensor;
      nonmagnetic nonconductive first and second read gap layers;
      the spin valve sensor being located between the first and second read gap layers;
      a ferromagnetic first shield layer; and
      the first and second read gap layers being located between the first shield layer and the first pole piece layer;
   the spin valve sensor including:
      a ferromagnetic free layer structure that has a magnetic moment;
      a ferromagnetic pinned layer structure that has a magnetic moment;
      a nonmagnetic conductive spacer layer located between the free layer structure and the pinned layer structure;
      an antiferromagnetic metallic pinning layer exchange coupled to the pinned layer structure for pinning the magnetic moment of the pinned layer structure;
      a conductive magnetic keeper layer for providing at least a partial magnetic flux closure for said pinned layer structure; and
      a nonmagnetic conductive first sense current field producing layer located between the keeper layer and the free layer structure for at least partially counterbalancing sense current fields from layers on an opposite side of the free layer structure; and
   a housing;
   a magnetic disk rotatably supported in the housing;
   a support mounted in the housing for supporting the magnetic head assembly with said ABS facing the magnetic disk so that the magnetic head assembly is in a transducing relationship with the magnetic disk;
   a spindle motor for rotating the magnetic disk;
   an actuator positioning means connected to the support for moving the magnetic head to multiple positions with respect to said magnetic disk; and
   a processor connected to the magnetic head, to the spindle motor and to the actuator for exchanging signals with the magnetic head, for controlling movement of the magnetic disk and for controlling the position of the magnetic head.

22. A magnetic disk drive as claimed in claim 21 including:
   a ferromagnetic second shield layer;
   a nonmagnetic isolation layer; and
   the second shield layer being located between the second gap layer and the isolation layer and the nonmagnetic isolation layer being located between the second shield layer and the first pole piece layer.

23. A magnetic disk drive as claimed in claim 21 wherein the keeper layer is nickel iron (NiFe).

24. A magnetic disk drive as claimed in claim 21 wherein the keeper layer is cobalt based and the first sense current field producing layer is copper.

25. A magnetic disk drive as claimed in claim 24 wherein the free layer structure includes a nickel iron (NiFe) free layer and a cobalt based layer with the cobalt based layer being located between the free layer and the first sense current field producing layer.

26. A magnetic disk drive as claimed in claim 25 wherein the free layer structure further includes a cobalt based nanolayer which is located between the free layer and the spacer layer.

27. A magnetic disk drive as claimed in claim 27 wherein the pinned layer structure is an antiparallel (AP) pinned layer structure that includes:
   first and second ferromagnetic AP pinned layers; and
   an antiparallel coupling layer located between the first and second AP pinned layers.

28. A magnetic disk drive as claimed in claim 24 including:
   a nonmagnetic conductive second sense current field producing layer;
   the keeper layer being located between the first and second sense current field producing layers; and
   the second sense current field producing layer being copper.

29. A magnetic disk drive as claimed in claim 28 wherein the free layer structure includes a nickel iron (NiFe) free layer and a cobalt based layer with the cobalt based layer being located between the free layer and the first sense current field producing layer.

30. A magnetic disk drive as claimed in claim 29 wherein the pinned layer structure is an antiparallel (AP) pinned layer structure that includes:
   first and second ferromagnetic AP pinned layers; and
   an antiparallel coupling layer located between the first and second AP pinned layers.

31. A method of making a magnetic read head comprising the steps of:
   making a spin valve sensor as follows:
      forming a ferromagnetic free layer structure that has a magnetic moment;
      forming a ferromagnetic pinned layer structure that has a magnetic moment;
      forming a nonmagnetic conductive spacer layer between the free layer structure and the pinned layer structure;
      forming an antiferromagnetic metallic pinning layer exchange coupled to the pinned layer structure for pinning the magnetic moment of the pinned layer structure;

forming a conductive magnetic keeper layer for providing at least a partial magnetic flux closure for said pinned layer structure; and forming a nonmagnetic conductive first sense current field producing layer located between the keeper layer and the free layer structure for at least partially counterbalancing sense current fields from layers on an opposite side of the free layer structure.

32. A method of making a magnetic read head as claimed in claim 31 including:

connecting first and second hard bias and lead layers to the spin valve sensor;

forming nonmagnetic nonconductive first and second read gap layers with the spin valve sensor and the first and second hard bias and lead layers located between the first and second read gap layers; and forming ferromagnetic first and second shield layers with the first and second read gap layers located between the first and second shield layers.

33. A method of making a magnetic read head as claimed in claim 32 wherein the keeper layer is formed of nickel iron (NiFe).

34. A method of making a magnetic read head as claimed in claim 32 wherein the keeper layer is formed of a cobalt based material and the first sense current field producing layer is formed of copper.

35. A method of making a magnetic read head as claimed in claim 34 wherein the free layer structure is formed with a nickel iron (NiFe) free layer and a cobalt based layer with the cobalt based layer located between the free layer and the first sense current field producing layer.

36. A method of making a magnetic read head as claimed in claim 35 wherein the free layer structure is further formed with a cobalt based nanolayer which is located between the free layer and the spacer layer.

37. A method of making a magnetic read head as claimed in claim 36 wherein the pinned layer structure is an antiparallel (AP) pinned layer structure that is made comprising the steps of:

forming first and second ferromagnetic AP pinned layers; and forming an antiparallel coupling layer between the first and second AP pinned layers.

38. A method of making a magnetic read head as claimed in claim 34 including:

forming a nonmagnetic conductive second sense current field producing layer with the keeper layer located between the first and second sense current field producing layers; and forming the second sense current field producing layer of copper.

39. A method of making a magnetic read head as claimed in claim 38 wherein the free layer structure is formed with a nickel iron (NiFe) free layer and a cobalt based layer with the cobalt based layer located between the free layer and the first sense current field producing layer.

40. A method of making a magnetic read head as claimed in claim 39 wherein the pinned layer structure is an antiparallel (AP) pinned layer structure that is made comprising the steps of:

forming first and second ferromagnetic AP pinned layers; and forming an antiparallel coupling layer between the first and second AP pinned layers.

41. A method of making a magnetic head assembly comprising the steps of:

making a write head comprising the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region;

making a read head as follows:

forming a spin valve sensor;

connecting first and second hard bias and lead layers to the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and a making of the spin valve sensor including:

forming a ferromagnetic free layer structure that has a magnetic moment;

forming a ferromagnetic pinned layer structure that has a magnetic moment;

forming a nonmagnetic conductive spacer layer between the free layer structure and the pinned layer structure;

forming an antiferromagnetic metallic pinning layer exchange coupled to the pinned layer structure for pinning the magnetic moment of the pinned layer structure;

forming a conductive magnetic keeper layer for providing at least a partial magnetic flux closure for said pinned layer structure; and forming a nonmagnetic conductive first sense current field producing layer located between the keeper layer and the free layer structure for at least partially counterbalancing sense current fields from layers on an opposite side of the free layer structure.

42. A method of making a magnetic head assembly as claimed in claim 41 comprising the steps of:

forming a ferromagnetic second shield layer;

forming a nonmagnetic isolation layer; and forming the second shield layer between the second gap layer and the isolation layer and the nonmagnetic isolation layer between the second shield layer and the first pole piece layer.

43. A method of making a magnetic head assembly as claimed in claim 41 wherein the keeper layer is formed of nickel iron (NiFe).

44. A method of making a magnetic head assembly as claimed in claim 41 wherein the keeper layer is formed of a cobalt based material and the first sense current field producing layer is formed of copper.

45. A method of making a magnetic head assembly as claimed in claim 44 wherein the free layer structure is formed with a nickel iron (NiFe) free layer and a cobalt based layer with the cobalt based layer located between the free layer and the first sense current field producing layer.

46. A method of making a magnetic head assembly as claimed in claim 45 wherein the free layer structure is further formed with a cobalt based nanolayer which is located between the free layer and the spacer layer.

47. A method of making a magnetic head assembly as claimed in claim 46 wherein the pinned layer structure is an antiparallel (AP) pinned layer structure that is made comprising the steps of:

forming first and second ferromagnetic AP pinned layers; and forming an antiparallel coupling layer between the first and second AP pinned layers.

48. A method of making a magnetic head assembly as claimed in claim 44 including:

forming a nonmagnetic conductive second sense current field producing layer with the keeper layer located between the first and second sense current field producing layers; and forming the second sense current field producing layer of copper.

49. A method of making a magnetic head assembly as claimed in claim 48 wherein the free layer structure is formed with a nickel iron (NiFe) free layer and a cobalt based layer with the cobalt based layer located between the free layer and the first sense current field producing layer.

50. A method of making a magnetic head assembly as claimed in claim 49 wherein the pinned layer structure is an antiparallel (AP) pinned layer structure that is made comprising the steps of:

forming first and second ferromagnetic AP pinned layers; and forming an antiparallel coupling layer between the first and second AP pinned layers.

* * * * *

UNITED STATES PATENT AND TRADEMARK OFFICE
CERTIFICATE OF CORRECTION

PATENT NO. : 6,552,881 B1
DATED : April 22, 2003
INVENTOR(S) : Mustafa Pinarbasi It is certified that error appears in the above-identified patent and that said Letters Patent is hereby corrected as shown below:

<u>Column 14,</u>
Line 28, after "claim" change "27" to -- 26 --

Signed and Sealed this

Eighteenth Day of November, 2003

JAMES E. ROGAN
*Director of the United States Patent and Trademark Office*